(12) United States Patent
Ma et al.

(10) Patent No.: US 9,613,056 B2
(45) Date of Patent: Apr. 4, 2017

(54) PEDESTRIAN NAVIGATION SYSTEM AND METHOD THEREOF (71) Applicant: INSTITUTE FOR INFORMATION INDUSTRY, Taipei (TW)

(72) Inventors: Chih-Chun Ma, Taoyuan (TW); Shih-Yao Wei, Taipei (TW); Rong-Sheng Wang, Taipei (TW); Shih-Chun Chou, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 23 days.

(21) Appl. No.: 14/714,355

(22) Filed: May 18, 2015

(65) Prior Publication Data

US 2016/0146609 A1   May 26, 2016

(30) Foreign Application Priority Data

Nov. 26, 2014 (TW) .............................. 103141040 A (51) Int. Cl.
  *G06F 17/30* (2006.01)
  *G01C 21/16* (2006.01)
  *G08G 1/095* (2006.01)

(52) U.S. Cl.
  CPC ..... *G06F 17/30241* (2013.01); *G01C 21/165* (2013.01)

(58) Field of Classification Search
  None
  See application file for complete search history.

(56) References Cited

U.S. PATENT DOCUMENTS

| 8,554,504 | B2* | 10/2013 | Sambongi | G01C 21/12 702/104 |
| 2006/0190168 | A1* | 8/2006 | Ohnishi | G01C 21/3629 701/433 |
| 2008/0120029 | A1 | 5/2008 | Zelek et al. | |
| 2011/0153197 | A1* | 6/2011 | Song | A61B 5/1038 701/533 |
| 2013/0231889 | A1* | 9/2013 | Hrybyk | G01C 21/20 702/141 |

FOREIGN PATENT DOCUMENTS

WO    2014099004 A1    6/2014

* cited by examiner

*Primary Examiner* — Mussa A Shaawat
*Assistant Examiner* — Abdhesh Jha
(74) *Attorney, Agent, or Firm* — CKC & Partners Co., Ltd.

(57) ABSTRACT

A pedestrian navigation system for navigating a foot apparatus comprises a system communication unit, a map database, a step data generation unit, a navigation path analysis unit and a feedback unit. The system communication unit communicates with an apparatus communication unit of the foot apparatus. The step data generation unit generates step data according to the sensing data of the foot apparatus. The navigation path analysis unit determines a navigation path and determines a heading direction of the foot apparatus. A turning direction and a turning angle are generated according to the navigation path and the heading direction. The feedback unit receives the turning direction and the turning angle to generate a feedback signal. The indication unit generates an indication signal according to the feedback signal to indicate the turning direction and the turning angle.

17 Claims, 4 Drawing Sheets

PEDESTRIAN NAVIGATION SYSTEM AND METHOD THEREOF

RELATED APPLICATIONS

This application claims priority to Taiwan Application Serial Number 103141040, filed Nov. 26, 2014, the entirety of which is herein incorporated by reference.

BACKGROUND

Field of Invention

The invention relates to a navigation system, and particularly relates to a navigation system and method thereof for a pedestrian.

Description of Related Art

At early stage, Global Positioning System (GPS) was applied in the area of navigation for transportation means such as airplanes, motor vehicles and motorcycles. Recently, the GPS function has been integrated into a pedestrian navigation system to guide pedestrians to meet the navigation requirement for pedestrians because of the progress of the communication technology.

In a typical wristband type or a belt type wearable apparatus, feedback apparatus is surrounded disposed in the wristband or the belt type. The wearable apparatus communicates with a portable device through a wireless communication apparatus, such as a Bluetooth device. When the portable device get the navigation information from its GPS device, the navigation information is transmitted to the feedback apparatus disposed in the wristband or the belt type through the portable apparatus. Then, the feedback apparatus indicates the user to turn by a vibration signal, a voice signal or other promotion signal. However, in the above navigation technology, the sensing data used to navigate is from the sensor disposed in the portable device. The wristband type or a belt type wearable apparatus is just used to indicate the direction for the user by vibration. However, the sensing data sensed by the sensor is affected by the position of the portable apparatus. Therefore, it is very difficult for the typical navigation technology to determine an exact heading direction of the user. Moreover, the typical feedback apparatus also may not indicate the turning direction and the angle for the user. Thus the typical navigation technology is not suitable for pedestrian navigations. Therefore, finding a way of developing a pedestrian navigation device designated for pedestrians demands immediate attentions and feasible solutions.

SUMMARY

A purpose of the present invention is to provide a navigation system and method thereof for a pedestrian. The sensor is directly disposed in a foot apparatus. Therefore, an exact heading direction of the pedestrian is determined. Am exact turning direction and turning angle are also generated to indicate the pedestrian.

Accordingly, the invention provides a pedestrian navigation system for navigating through a foot apparatus of a pedestrian. The foot apparatus has a sensor, an orientation unit, an apparatus communication unit, and an indication unit. The sensor senses a sensing data of the foot apparatus. The orientation unit generates an orientation data. The apparatus communication unit communicates with the pedestrian navigation system through a communication network. The pedestrian navigation system comprises a system communication unit, a map database, a step data generation unit, a navigation path analysis unit and a feedback unit. The system communication unit communicates with the apparatus communication unit of the foot apparatus through the communication network. The map database stores a map data. The step data generation unit generates step data according to the sensing data. The navigation path analysis unit coupling with the map database receives the map data and the orientation data to form a navigation path, and also receives the step data of the foot apparatus to determine a heading direction of the foot apparatus. A turning direction and a turning angle are generated by the navigation path analysis unit according to the navigation path and the heading direction. The feedback unit coupling with the navigation path analysis unit receives the turning direction and the turning angle to generate a feedback signal to transmit to the indication unit. The indication unit generates an indication signal according to the feedback signal to indicate the turning direction and the turning angle.

The invention also provides a pedestrian navigation system for navigating through a foot appliance of a pedestrian. The foot appliance has a sensor, a wireless communication device and an indication unit. The sensor senses a sensing data of the foot appliance. The wireless communication device communicates with a portable apparatus. The portable apparatus has an orientation unit, a portable apparatus wireless and a portable apparatus communication unit. The orientation unit generates an orientation data. The portable apparatus wireless communication device communicates with the wireless communication device to receive the sensing data. The pedestrian navigation system comprises a system communication unit, a map database, a step data generation unit, a navigation path analysis unit, and a feedback unit. The system communication unit communicates with the portable apparatus communication unit through a communication network to receive the sensing data and the orientation data. The map database stores a map data. The step data generation unit generates a step data according to the sensing data. The navigation path analysis unit coupling with the map database receives the map data and the orientation data to form a navigation path, and receives the step data of the foot appliance to determine a heading direction of the foot appliance. A turning direction and a turning angle are generated by the navigation path analysis unit according to the navigation path and the heading direction. The feedback unit coupling with the navigation path analysis unit receives the turning direction and the turning angle to generate a feedback signal to transmit to the portable apparatus. The portable apparatus transmits the feedback signal to the indication unit of the foot appliance. The indication unit generates an indication signal according to the feedback signal to indicate the turning direction and the turning angle.

The invention also provides a pedestrian navigation method using in a pedestrian navigation system for navigating through a foot apparatus of a pedestrian. The foot apparatus has a sensor, an orientation unit, an apparatus communication unit, and an indication unit. The sensor senses a sensing data of the foot apparatus. The orientation unit generates an orientation data. The apparatus communication unit communicates with the pedestrian navigation system through a communication network. The method comprises to communicate with the apparatus communication unit of the foot apparatus through the communication network by a system communication unit, then, to generate a step data according to the sensing data by a step data generation unit. Next, a map data of a map database and the orientation data are received to form a navigation path, and the step data of the foot apparatus is received to determine a heading direction of the foot apparatus by a navigation path analysis unit. Then, a turning direction and a turning angle are generated by the navigation path analysis unit according to the navigation path and the heading direction. A feedback signal is generated according to the turning direction and the turning angle by a feedback unit to transmit to the indication unit. Finally, an indication signal is generated according to the feedback signal by the indication unit to indicate the turning direction and the turning angle.

The invention further provides a pedestrian navigation method using in a pedestrian navigation system for navigating through a foot appliance of a pedestrian. The foot appliance has a sensor, a wireless communication device and an indication unit. The sensor senses a sensing data of the foot appliance. The wireless communication device communicates with a portable apparatus. The portable apparatus has an orientation unit, a portable apparatus wireless and a portable apparatus communication unit. The orientation unit generates an orientation data. The portable apparatus wireless communication device communicates with the wireless communication device to receive the sensing data. The method comprises to communicate with the portable apparatus communication unit through a communication network by a system communication unit to receive the sensing data and the orientation data. Then, a step data is generated according to the sensing data by a step data generation unit. Next, a map data of a map database and the orientation data are received to form a navigation path, and the step data of the foot appliance is received to determine a heading direction of the foot appliance by a navigation path analysis unit. A turning direction and a turning angle are generated by the navigation path analysis unit according to the navigation path and the heading direction. Next, a feedback signal is generated according to the turning direction and the turning angle by a feedback unit to transmit to the portable apparatus. Finally, the feedback signal is transmitted to the indication unit of the foot appliance through the portable apparatus. An indication signal is generated according to the feedback signal by the indication unit to indicate the turning direction and the turning angle.

Accordingly, the sensor is directly disposed in the foot appliance. Therefore, the sensing data sensed by the sensor can completely response to the motion of the foot appliance. Therefore, the pedestrian navigation system can generate an exact turning direction and turning angle according to the sensing data.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
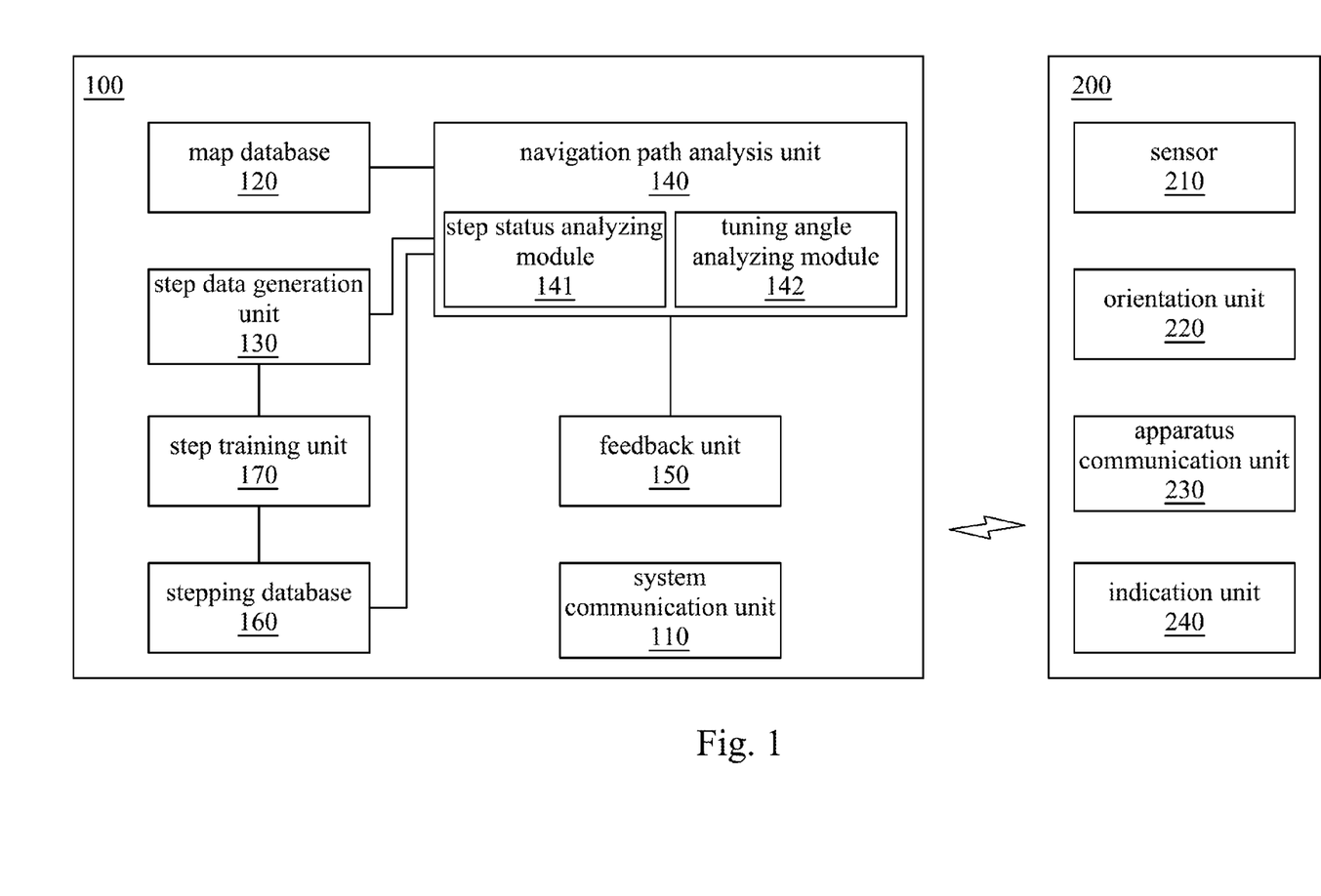
FIG. 1 illustrates a schematic diagram of a pedestrian navigation system according to an embodiment of the invention.

FIG. 1 illustrates a schematic diagram of a pedestrian navigation system according to an embodiment of the invention. The pedestrian navigation system 100 is used to navigate a pedestrian through a foot apparatus 200. That is, the pedestrian navigation system 100 generates a feedback signal to a foot apparatus 200 to navigate the foot apparatus 200 to go forward or to turn. The foot apparatus 200 includes a sensor 210, an orientation unit 220, an apparatus communication unit 230 and an indication unit 240. The sensor 210 is used to sense the sensing data of the foot apparatus 200. That is, the sensor 210 detects the motion, such as the step information, of the foot apparatus 200. In an embodiment, the sensor 210 can be a triaxial accelerometer, a Gyroscope or an electronic compass to sense the motion of the foot apparatus 200 in a three dimension space. The orientation unit 220 is used to generate orientation data of the foot apparatus 200. In an embodiment, the orientation unit 220 has a Global Positioning System (GPS) to generate the orientation data. The apparatus communication unit 230 may wireless communicate with the pedestrian navigation system 100 through a communication network. Therefore, the foot apparatus 200 may communication with the pedestrian navigation system 100 to transmit and receive data. For example, the apparatus communication unit 230 transmits the sensing data from the sensor 210 and the orientation data from orientation unit 220 to the pedestrian navigation system 100, or to receive the feedback signal from the pedestrian navigation system 100. The indication unit 240 indicates the foot apparatus 200 to go forward or to turn, such as the turning direction and the turning angle, according to the feedback signal from the pedestrian navigation system 100.

The pedestrian navigation system 100 includes a system communication unit 110, a map database 120, a step data generation unit 130, a navigation path analysis unit 140 and a feedback unit 150. The system communication unit 110 may wireless communicate with the apparatus communication unity 230 of the foot apparatus 200 through a communication network. Therefore, the foot apparatus 200 may communication with the pedestrian navigation system 100 to transmit and receive data. For example, the system communication unit 110 receives the sensing data from the sensor 210 and the orientation data from orientation unit 220 to the pedestrian navigation system 100, or to transmit the feedback signal to the indication unit 240 of the foot apparatus 200. The map database 120 stores a map data. The step data generation unit 130 generates step data according to the sensing data from the sensor 210 of the foot apparatus 200. The step data includes a angle of foot deflection and a distance between steps. That is, the angle of foot deflection and the distance between steps of the foot apparatus 200. The navigation path analysis unit 140 couples with the map database 120 and the step data generation unit 130. The navigation path analysis unit 140 gathers a map from the map database 120 and the orientation data from the orientation unit 220 in the foot apparatus 200 to form a navigation path in the map. The navigation path analysis unit 140 further receives the step data from the step data generation unit 130 to determine the heading direction of the foot apparatus 200. Then, a turning direction and a turning angle is generated by the navigation path analysis unit 140 according to the navigation path and the heading direction of the foot apparatus 200. The feedback unit 150 couples with the navigation path analysis unit 140 to receive the turning direction and the turning angle to generate a feedback signal. The feedback signal is transferred to the indication unit 240 in the foot apparatus 200 through the system communication unit 110. The indication unit 240 generates an indication signal according to the feedback signal to indicate the turning direction and the turning angle to the foot apparatus 200. That is, the turning direction and the turning angle are informed to the user by the indication unit 240 to lead the user to turn to follow the navigation path.

The navigation path analysis unit 140 further includes a step status analyzing module 141 and a turning angle analyzing module 142. The step status analyzing module 141 determines the heading direction of the foot apparatus 200 according to the angle of foot deflection and the distance between steps from the step data generation unit 130. The turning angle analyzing module 142 generates the turning direction and the turning angle according to the navigation path and the heading direction determined by the step status analyzing module 141. In an embodiment, the foot apparatus 200 is a pair of shoes. The angle of foot deflection generated by the step data generation unit 130 is the angle of the shoe on the right hand side and the shoe on the left hand side corresponding to an axle respectively when the user walks. The distance between steps generated by the step data generation unit 130 is the distance between the shoe on the right hand side and the shoe on the left hand side when the user walks. Accordingly, the step status analyzing module 141 determines the heading direction according to the angle of the shoe on the right hand side and the shoe on the left hand side corresponding to an axle respectively. For example, the heading direction is the average of the angle of the shoe on the right hand side and the angle of the shoe on the left hand side corresponding to an axle respectively. However, other method is also used to determine the heading direction. After the step status analyzing module 141 generates the heading direction, the turning angle analyzing module 142 compares the heading direction with the navigation path to determine whether or not the heading direction matches the navigation path. If the heading direction does not match the navigation path, the step status analyzing module 141 generates the turning direction and the turning angle according to the comparing heading direction determined by the step status analyzing module 141.

Moreover, if the foot apparatus 200 is a pair of shoes include a shoe on the right hand side and a shoe on the left hand side. The indication unit 240 is a vibration unit that is disposed in the shoe on the right hand side and the shoe on the left hand side respectively. Accordingly, when the navigation path analysis unit 140 determines that the foot apparatus 200 should be turned 90 degrees to the right, the turning direction, right, and the turning angle, 90 degrees, are transferred to the feedback unit 150 to generate a feedback signal. The system communication unit 110 of the pedestrian navigation system 100 transfers the feedback signal to the indication unit 240 of the foot apparatus 200 to generate an indication signal. The indication signal selects the vibration unit disposed in the shoe on the right hand side to vibrate to inform the user to turn right according to the turning direction of right. When the user start to turn right, the vibration unit disposed in the shoe on the right hand side continue to vibrate until the user has turned 90 degrees to the right. Because the sensor 210 is directly disposed in the foot apparatus 200, the sensing data sensed by the sensor 210 may really response the motion of the foot apparatus 200. The pedestrian navigation system 100 may generate a more accurate turning direction and turning angle to lead the pedestrians on the navigation path according to the sensing data.

In another embodiment, because each person has his own individual way of walking, the walking direction could be different even though the angle of foot deflection and the distance between steps of two persons are the same. Therefore, for matching the personal special, the pedestrian navigation system 100 further comprises a stepping database 160 coupling with the navigation path analysis unit 140 to record plenty historical step data and a personal step model. The navigation path analysis unit 140 can correct the walking direction according to the historical step data and the personal step model. That is, the navigation path analysis unit 140 not only refers to the angle of foot deflection and the distance between steps to determine the walking direction but also refers to the historical step data and the personal step model to correct the walking direction so as to generate an accuracy walking direction. For generating the personal step model, the pedestrian navigation system 100 further comprises a step training unit 170 coupling with the stepping database 160. The step training unit 170 receives the step data from the step data generation unit 130 and transmit the step data to the stepping database 160 to act as the historical step data. That is, the step data generated by the step data generation unit 130 in each time is stored in the stepping database 160 to act as the historical step data. The step training unit 170 generates the personal step model according to the historical step data.

Figure 2:
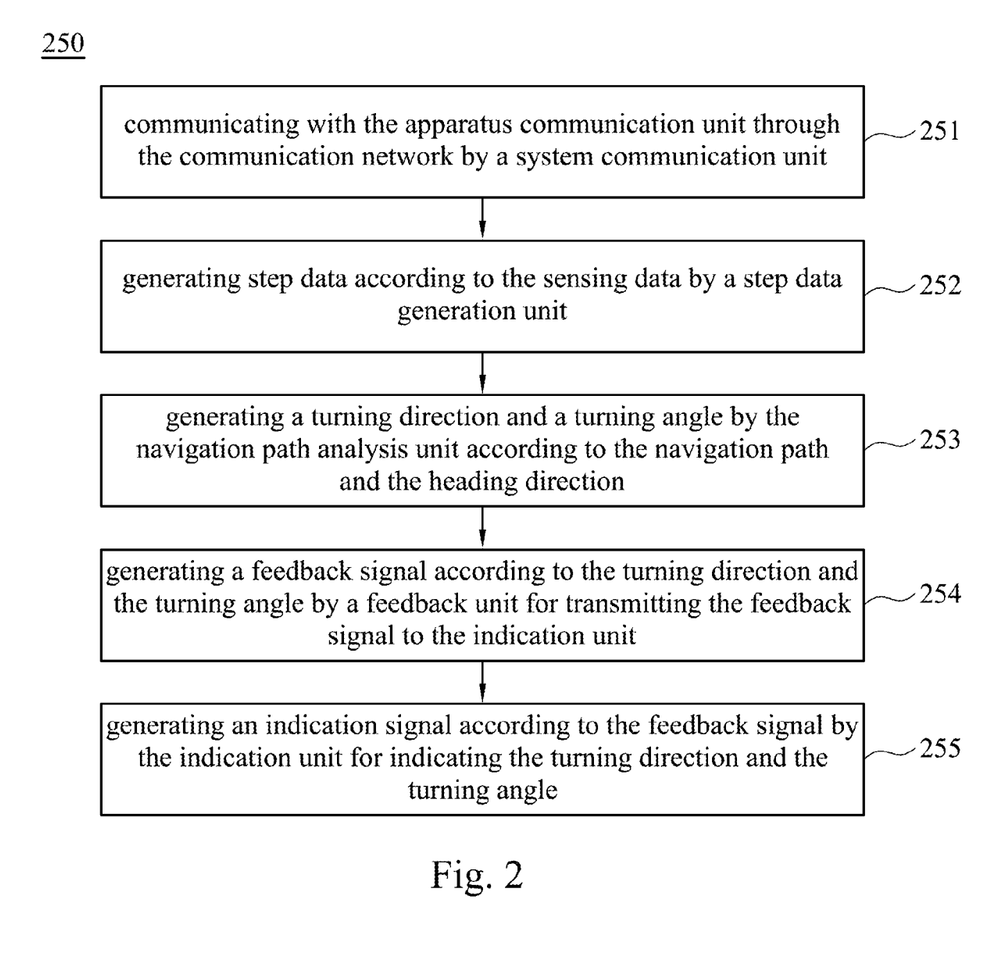
FIG. 2 illustrates a flow chart for pedestrian navigation method according to an embodiment of the invention.

FIG. 2 illustrates a flow chart for pedestrian navigation method according to an embodiment of the invention. The pedestrian navigation method 250 is used in the pedestrian navigation system 100 as shown in the FIG. 1 to generate a feedback signal to indicate the foot apparatus 200 to go forward or to turn, such as the turning direction and the turning angle. Please refer to the FIG. 1 and FIG. 2. According to the pedestrian navigation method 250, in step 251, the system communication unit 110 wireless communicates with the apparatus communication unity 230 of the foot apparatus 200 through a communication network. Therefore, the foot apparatus 200 may communication with the pedestrian navigation system 100 to transmit and receive data. Next, in step 252, the step data generation unit 130 generates the step data according to the sensing data from the sensor 210 of the foot apparatus 200. The sensor 210 senses the motion, such as the step data, of the foot apparatus 200 to generate the sensing data. Then, in step 253, the navigation path analysis unit 140 generates a turning direction and a turning angle according to the path of navigation and the heading direction of the foot apparatus 200. The navigation path analysis unit 140 gathers a map from the map database 120 and the orientation data from the orientation unit 220 in the foot apparatus 200 to form a path of navigation. The navigation path analysis unit 140 further receives the step data from the step data generation unit 130 to determine the heading direction of the foot apparatus 200. Then, the navigation path analysis unit 140 generates a turning direction and a turning angle according to the path of navigation and the heading direction. In step 254, a feedback signal is generated by the feedback unit 150 according to the turning direction and the turning angle. The feedback signal is transmitted to the foot apparatus 200. The feedback unit 150 couples with the navigation path analysis unit 140 to receive the turning direction and the turning angle to generate a feedback signal. Finally, in step 255, the indication unit 240 in the foot apparatus 200 generates an indication signal to indicate the turning direction and the turning angle. The feedback signal is transferred to the indication unit 240 in the foot apparatus 200 through the system communication unit 110. The indication unit 240 generates the indication signal according to the feedback signal to indicate the turning direction and the turning angle to the foot apparatus 200.

Figure 3:
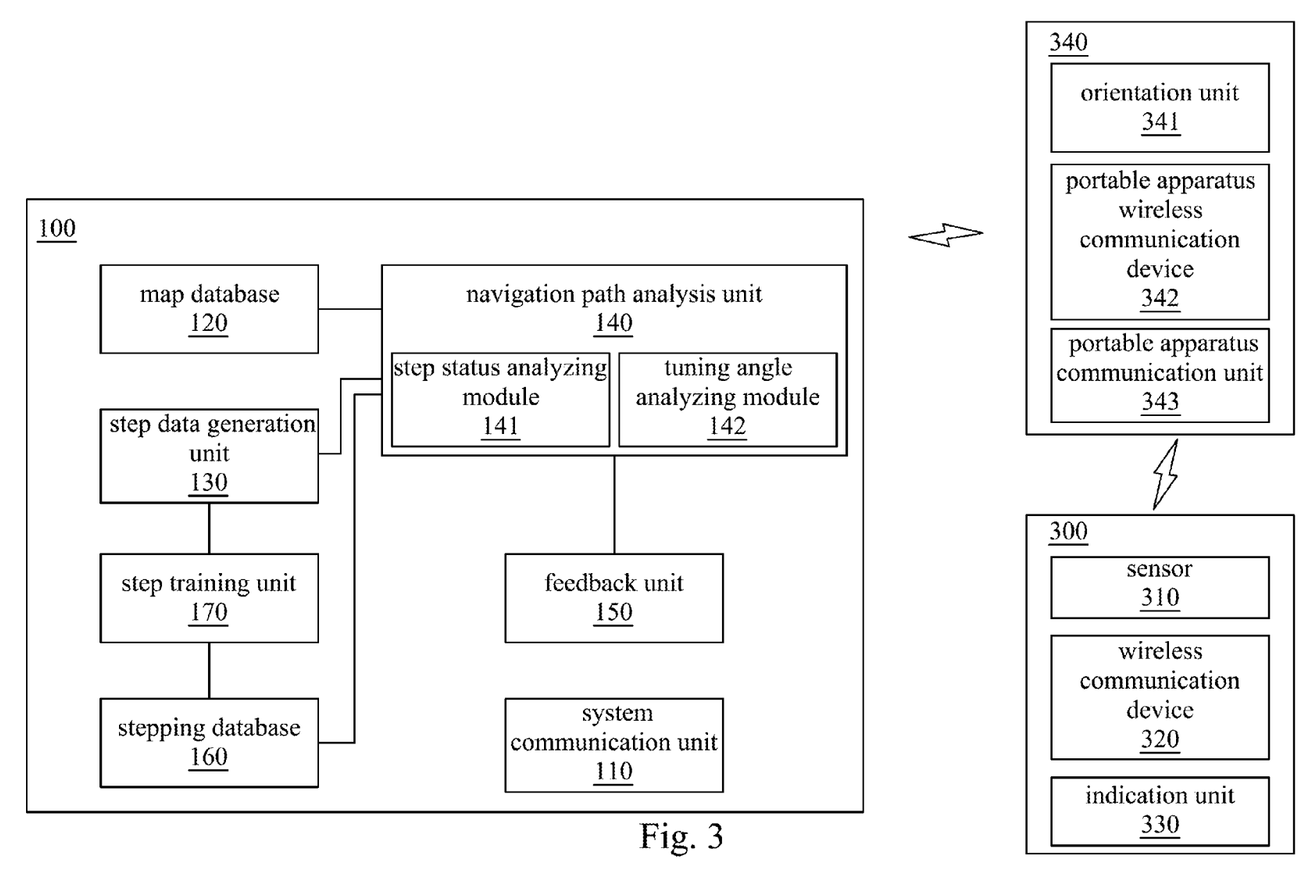
FIG. 3 illustrates a schematic diagram of a pedestrian navigation system according to another embodiment of the invention.

FIG. 3 illustrates a schematic diagram of a pedestrian navigation system according to another embodiment of the invention. In the first embodiment, the foot apparatus 200 can directly communicates with the pedestrian navigation system 100 through the communication unit 230. Therefore, the sensing data sensed by the sensor 210 and the orientation data from the orientation unit 220 in the foot apparatus 200 can be directly transmitted to the pedestrian navigation system 100. However, in the present embodiment, the sensing data sensed by the sensor 310 in the foot appliance 300 is transmitted to a portable apparatus 340. The, the sensing data is transmitted to the pedestrian navigation system 100 through the portable apparatus 340. Similarly, the feedback signal generated by the pedestrian navigation system 100 is transmitted to the portable apparatus 340. Then, the feedback signal is transmitted to the indication unit 330 in the foot appliance 300 through the portable apparatus 340. Moreover, the orientation data is generated by the orientation unit 341 in the portable apparatus 340. In other words, the foot appliance 300 does not the orientation function. Therefore, the foot appliance 300 includes a sensor 310, a wireless communication device 320 and an indication unit 330. The sensor 310 is used to sense the sensing data of the foot appliance 300. That is, the sensor 310 senses the motion, such as the step data, of the foot appliance 300. In an embodiment, the sensor 310 is a tri-axial accelerometer, a Gyroscope and a electronic compass to sense the motion of the foot appliance 300 in a three dimension space. The wireless communication device 320 may wireless communicate with the portable apparatus 340 through a communication network. Therefore, the foot appliance 300 may communication with the portable apparatus 340 to transmit and receive data. For example, the wireless communication device 320 transmits the sensing data sensed by the sensor 310 to the portable apparatus 340, then, the portable apparatus 340 transmits the sensing data to the pedestrian navigation system 100, or to receive the feedback signal from the pedestrian navigation system 100 through the portable apparatus 340. In an embodiment, the wireless communication device 320 is a Bluetooth device. The indication unit 340 indicates the foot appliance 300 to go forward or to turn, such as the turning direction and the turning angle, according to the feedback signal from the pedestrian navigation system 100.

The portable apparatus 340 communicates with both the pedestrian navigation system 100 and the foot appliance 300. Therefore, the portable apparatus 340 comprises an orientation unit 341, a portable apparatus wireless communication device 342 and a portable apparatus communication unit 343. The orientation unit 341 generates the orientation data. The portable apparatus wireless communication device 342 communicates with the wireless communication device 320 of the foot appliance 300 to receive the sensing data sensed by the sensor 310. The portable apparatus communication unit 343 communicates with the system communication unit 110 in the pedestrian navigation system 100.

The pedestrian navigation system 100 includes a system communication unit 110, a map database 120, a step data generation unit 130, a navigation path analysis unit 140 and a feedback unit 150. In this embodiment, the feedback signal generated by the pedestrian navigation system 100 is not directly transmitted to the foot appliance 300. The feedback signal is transmitted to the foot appliance 300 through the portable apparatus 340. Therefore, the system communication unit 110 may communicate with the portable apparatus communication unit 343 in the portable apparatus 340 through a communication network. Therefore, the portable apparatus 340 may communication with the pedestrian navigation system 100 to transmit and receive data. For example, the pedestrian navigation system 100 receives the sensing data sensed by the sensor 310 in the foot appliance 300 through the portable apparatus 340, or transmits the feedback signal to the foot appliance 300 through the portable apparatus 340. Moreover, the function of the map database 120, the step data generation unit 130, the navigation path analysis unit 140 and the feedback unit 150 have been described in the first embodiment. Therefore, here no longer gives unnecessary detail.

Figure 4:
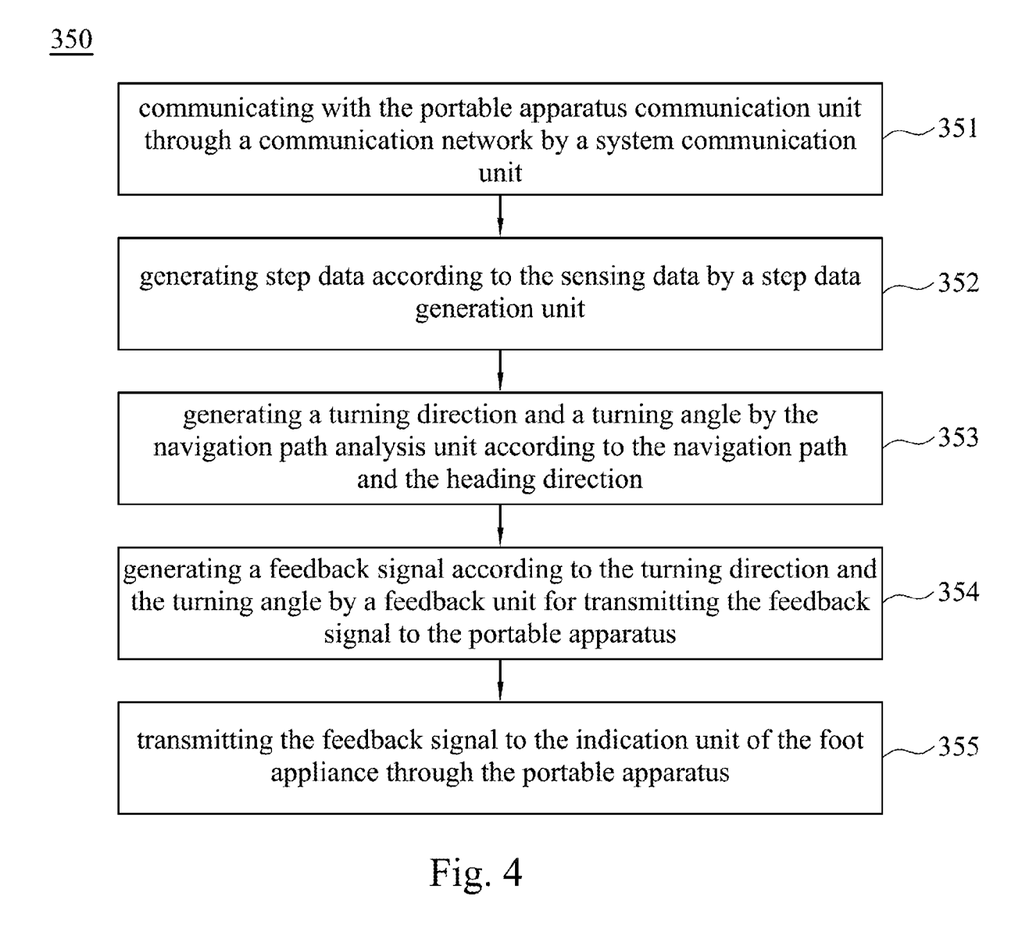
FIG. 4 illustrates a flow chart for pedestrian navigation method according to another embodiment of the invention.

FIG. 4 illustrates a flow chart for pedestrian navigation method according to another embodiment of the invention. The pedestrian navigation method 350 is used in the pedestrian navigation system 100 as shown in the FIG. 3 to generate a feedback signal to indicate the foot appliance 300 to go forward or to turn, such as the turning direction and the turning angle. Please refer to the FIG. 1 and FIG. 3. According to the pedestrian navigation method 350, in step 351, the system communication unit 110 wireless communicates with the portable apparatus communication unit 343 of the portable apparatus 340 through a communication network. Therefore, the portable apparatus 340 may communication with the pedestrian navigation system 100 to receive the sensing data sensed by the sensor 310 in the foot appliance 300 and the orientation data from the orientation unit 341 in the portable apparatus 340. The sensor 310 senses a motion, such as the step data, of the foot appliance 300 to generate the sensing data. Next, in step 352, the step data generation unit 130 generates the step data according to the sensing data from the sensor 310 of the foot appliance 300. The sensing data sensed by the sensor 310 is transmitted to the step data generation unit 130 in the pedestrian navigation system 100 through the portable apparatus 340. Then, in step 353, the navigation path analysis unit 140 generates a turning direction and a turning angle according to the path of navigation and the heading direction of the foot appliance 300. The navigation path analysis unit 140 gathers a map from the map database 120 and the orientation data from the orientation unit 331 in the portable apparatus 340 to form a path of navigation. The navigation path analysis unit 140 further receives the step data from the step data generation unit 130 to determine the heading direction of the foot appliance 300. Then, the navigation path analysis unit 140 generates a turning direction and a turning angle according to the path of navigation and the heading direction. In step 354, a feedback signal is generated by the feedback unit 150 according to the turning direction and the turning angle. The feedback signal is transmitted to the portable apparatus 340. The feedback unit 150 couples with the navigation path analysis unit 140 to receive the turning direction and the turning angle to generate a feedback signal. Finally, in step 355, the portable apparatus 340 transmits the feedback signal to the indication unit 330 in the foot appliance 300. The indication unit 330 generates an indication signal to indicate the turning direction and the turning angle according to the feedback signal. The feedback signal is transmitted to the portable apparatus 340 through the system communication unit 110. Then, the portable apparatus 340 transmits the feedback signal to the indication unit 330 in the foot appliance 300 to indicate the turning direction and the turning angle to the foot appliance 300.

Accordingly, the sensor is directly disposed in the foot appliance. Therefore, the sensing data sensed by the sensor can completely response to the motion of the foot appliance. Therefore, the pedestrian navigation system can generate an exact turning direction and turning angle according to the sensing data.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A pedestrian navigation system through a foot apparatus of a pedestrian to navigate, which the foot apparatus has a sensor to sense a sensing data of the foot apparatus, an orientation unit to generate an orientation data, an apparatus communication unit to communicate with the pedestrian navigation system through a communication network, and an indication unit, the pedestrian navigation system comprising:
    a system communication unit for communicating with the apparatus communication unit of the foot apparatus through the communication network;
    a map database for storing a map data;
    a step data generation unit for generating step data according to the sensing data from the sensor of the foot apparatus, wherein the step data includes an angle of foot deflection and a distance between steps of the foot apparatus;
    a navigation path analysis unit coupled with the map database for receiving the map data and the orientation data to form a navigation path, for receiving the step data of the foot apparatus to determine a heading direction of the foot apparatus, and for generating a turning direction and a turning angle by the navigation path analysis unit according to the navigation path and the heading direction;
    a stepping database coupled with the navigation path analysis unit, and the stepping database records a plurality of historical step data and a personal step model of the pedestrian, and the navigation path analysis unit amends the heading direction according to the historical data and the personal step model of the pedestrian; and
    a feedback unit coupled with the navigation path analysis unit for receiving the turning direction and the turning angle to generate a feedback signal and for transmitting the feedback signal to the indication unit,
    wherein the indication unit generates an indication signal according to the feedback signal to indicate the turning direction and the turning angle.

2. The pedestrian navigation system of claim 1, wherein the sensor is a triaxial accelerometer, a Gyroscope and an electronic compass.

3. The pedestrian navigation system of claim 1, further comprising a step training unit coupled with the stepping database, wherein the step data are measured by the step training unit and are transmitted to the stepping database to act as the historical step data, and the personal step model is generated according to the historical step data by the step training unit.

4. The pedestrian navigation system of claim 1, wherein the navigation path analysis unit further comprising:
    a step status analyzing module for determining the heading direction of the foot apparatus according to the angle of foot deflection and the distance between steps; and
    a turning angle analyzing module for generating the turning direction and the turning angle according to the navigation path and the heading direction.

5. The pedestrian navigation system of claim 1, wherein the foot apparatus is a pair of shoes including a shoe on the right hand side and a shoe on the left hand side, and the indication unit is two vibration units that are disposed in the shoe on the right hand side and the shoe on the left hand side, respectively,
    wherein the indication signal is a vibration generated by one of the two vibration units according to the turning direction, and the vibration is stopped when the foot apparatus is turned.

6. A pedestrian navigation system through a foot appliance of a pedestrian to navigate, which the foot appliance has a sensor to sense a sensing data of the foot appliance, a wireless communication device to communicate with a portable apparatus, and an indication unit, wherein the portable apparatus has an orientation unit to generate an orientation data, a portable apparatus wireless communication device to communicate with the wireless communication device to receive the sensing data, and a portable apparatus communication unit, the pedestrian navigation system comprising:
    a system communication unit for communicating with the portable apparatus communication unit through a communication network to receive the sensing data and the orientation data;
    a map database for storing a map data;
    a step data generation unit for generating step data according to the sensing data from the sensor of the foot apparatus, wherein the step data includes an angle of foot deflection and a distance between steps of the foot apparatus;
    a navigation path analysis unit coupled with the map database for receiving the map data and the orientation data to form a navigation path, and for receiving the step data of the foot appliance to determine a heading direction of the foot appliance, and for generating a turning direction and a turning angle by the navigation path analysis unit according to the navigation path and the heading direction;
    a stepping database coupled with the navigation path analysis unit, and the stepping database records a plurality of historical step data and a personal step model of the pedestrian, and the navigation path analysis unit amends the heading direction according to the historical data and the personal step model of the pedestrian; and
    a feedback unit coupled with the navigation path analysis unit for receiving the turning direction and the turning angle to generate a feedback signal and for transmitting the feedback signal to the portable apparatus, wherein the portable apparatus transmits the feedback signal to the indication unit of the foot appliance, and the indication unit generates an indication signal according to the feedback signal to indicate the turning direction and the turning angle.

7. The pedestrian navigation system of claim 6, wherein the wireless communication device of the foot appliance is a Bluetooth device.

8. The pedestrian navigation system of claim 6, wherein the sensor is a triaxial accelerometer, a Gyroscope and an electronic compass.

9. The pedestrian navigation system of claim 6, further comprising a step training unit coupled with the stepping database, wherein the step data are measured by the step training unit and are transmitted to the stepping database to act as the historical step data, and the personal step model is generated according to the historical step data by the step training unit.

10. The pedestrian navigation system of claim 6, wherein the navigation path analysis unit further comprising:
   a step status analyzing module for determining the heading direction of the foot appliance according to the angle of foot deflection and the distance between steps; and
   a turning angle analyzing module for generating the turning direction and the turning angle according to the navigation path and the heading direction.

11. The pedestrian navigation system of claim 6, wherein the foot appliance is a pair of shoes including a shoe on the right hand side and a shoe on the left hand side, and the indication unit is two vibration units that are disposed in the shoe on the right hand side and the shoe on the left hand side, respectively,
   wherein the indication signal is a vibration generated by one of the two vibration units according to the turning direction and the vibration is stopped when the foot appliance is turned.

12. A pedestrian navigation method using in a pedestrian navigation system through a foot apparatus of a pedestrian to navigate, which the foot apparatus has a sensor to sense a sensing data of the foot apparatus, an orientation unit to generate an orientation data, an apparatus communication unit to communicate with the pedestrian navigation system through a communication network, and an indication unit, the pedestrian navigation method comprising:
   communicating with the apparatus communication unit of the foot apparatus through the communication network by a system communication unit;
   generating step data according to the sensing data from the sensor of the foot apparatus by a step data generation unit, wherein the step data includes an angle of foot deflection and a distance between steps of the foot apparatus;
   receiving a map data of a map database and the orientation data to form a navigation path, and receiving the step data of the foot apparatus to determine a heading direction of the foot apparatus by a navigation path analysis unit, and generating a turning direction and a turning angle by the navigation path analysis unit according to the navigation path and the heading direction;
   generating a feedback signal according to the turning direction and the turning angle by a feedback unit for transmitting the feedback signal to the indication unit;
   recording a plurality of historical step data and a personal step model through a stepping database, and the navigation path analysis unit amends the heading direction according to the historical data and the personal step model of the pedestrian; and
   generating an indication signal according to the feedback signal by the indication unit for indicating the turning direction and the turning angle.

13. The pedestrian navigation method of claim 12, further comprising:
   transmitting the step data to the stepping database through a step training unit to act as the historical step data, and the personal step model is generated by the step training unit according to the historical step data.

14. The pedestrian navigation method of claim 12, wherein to determine a heading direction of the foot apparatus by the navigation path analysis unit further comprising to determine the heading direction of the foot apparatus according to the angle of foot deflection and the distance between steps.

15. A pedestrian navigation method for a pedestrian navigation system through a foot appliance of a pedestrian to navigate, which the foot appliance has a sensor to sense a sensing data of the foot appliance, a wireless communication device to communicate with a portable apparatus, and an indication unit, wherein the portable apparatus has an orientation unit to generate an orientation data, a portable apparatus wireless communication device to communicate with the wireless communication device to receive the sensing data, and a portable apparatus communication unit, the method comprising:
   communicating with the portable apparatus communication unit through a communication network by a system communication unit to receive the sensing data and the orientation data;
   generating step data according to the sensing data from the sensor of the foot apparatus by a step data generation unit, wherein the step data includes an angle of foot deflection and a distance between steps of the foot apparatus;
   receiving a map data of a map database and the orientation data to form a navigation path, and receiving the step data of the foot appliance to determine a heading direction of the foot appliance by a navigation path analysis unit, and generating a turning direction and a turning angle by the navigation path analysis unit according to the navigation path and the heading direction;
   recording a plurality of historical step data and a personal step model through a stepping database, and the navigation path analysis unit amends the heading direction according to the historical data and the personal step model of the pedestrian;
   generating a feedback signal according to the turning direction and the turning angle by a feedback unit for transmitting the feedback signal to the portable apparatus; and
   transmitting the feedback signal to the indication unit of the foot appliance through the portable apparatus, generating an indication signal according to the feedback signal by the indication unit for indicating the turning direction and the turning angle.

16. The pedestrian navigation method of claim 15, further comprising:
   transmitting the step data to the stepping database through a step training unit to act as the historical step data, and the personal step model is generated by the step training unit according to the historical step data.

17. The pedestrian navigation method of claim 15, wherein to determine a heading direction of the foot appliance by the navigation path analysis unit further comprising to determine the heading direction of the foot appliance according to the angle of foot deflection and the distance between steps.

* * * * *